United States Patent [19]

Maher et al.

[11] Patent Number: 4,811,162

[45] Date of Patent: Mar. 7, 1989

[54] CAPACITOR END TERMINATION COMPOSITION AND METHOD OF TERMINATING

[75] Inventors: John P. Maher, Cranford; Pascaline H. Nguyen, Marlboro, both of N.J.

[73] Assignee: Engelhard Corporation, Edison, N.J.

[21] Appl. No.: 43,116

[22] Filed: Apr. 27, 1987

[51] Int. Cl.⁴ .................. H01G 1/14; H01G 13/00
[52] U.S. Cl. .................................. 361/308; 361/321; 29/25.42
[58] Field of Search ..................... 361/308–310, 361/402, 306, 321; 338/272, 327, 332; 29/25.42

[56] References Cited

U.S. PATENT DOCUMENTS

| 2,585,752 | 2/1952 | Dorst | 361/321 X |
| 3,612,963 | 10/1971 | Piper et al. | 361/321 |
| 3,992,761 | 11/1976 | McElroy et al. | 361/309 X |
| 4,158,218 | 6/1979 | McLaurin et al. | 361/310 X |

FOREIGN PATENT DOCUMENTS 151529 10/1981 Fed. Rep. of Germany ...... 361/321

Primary Examiner—Donald A. Griffin

[57] ABSTRACT

A composition for use in terminating a capacitor composed of a ceramic body containing embedded metal electrodes is disclosed. The end termination composition comprises a metallo organic silver material. A method for terminating a capacitor employing the metallo organic silver based composition is also disclosed.

12 Claims, 1 Drawing Sheet

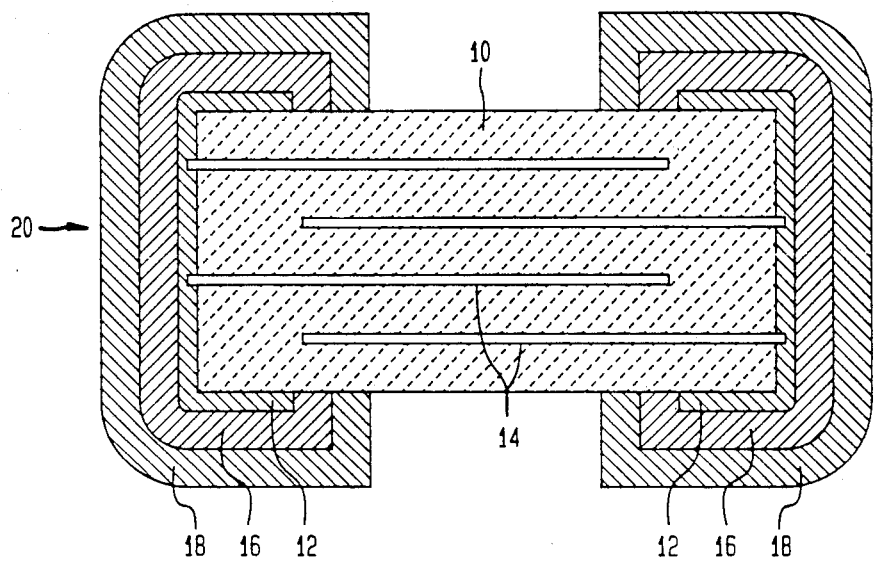

CAPACITOR END TERMINATION COMPOSITION AND METHOD OF TERMINATING

BACKGROUND OF THE INVENTION

I. Field of the Invention

The present invention is directed to a metallo organic silver based end termination composition for a ceramic capacitor and a method for terminating such a capacitor and the terminated capacitor.

II. Description of the Prior Art

Multilayer capacitors generally comprise a ceramic body such as barium titanate, a plurality of metal film electrodes such as Ag/Pd or Pd electrodes embedded in the ceramic body and end terminations of a conductive material contacting the exposed ends of alternate electrodes and adhering to the end portions of the ceramic body. Conventional end termination compositions comprise thick film pastes composed of a glass frit mixed with a metal or metal alloy such as silver or silver/palladium. The frit provides adhesion to the ceramic body and holds the metal or metal alloy particles together.

Capacitor manufacturers would for cost reasons prefer an all silver end termination. As much as 20% palladium is required to resist leaching of the silver during soldering of the capacitor chips to leads and/or circuit boards. Because of the extremely high cost of palladium, capacitor manufacturers have looked for alternate methods of terminating capacitors to reduce the overall cost of manufacture.

A newer alternate method of manufacture comprises applying a plated layer of nickel as a solder leach barrier over a pure silver end termination. According to this method, a thick film silver paste containing silver and glass frit is applied to the ends of the capacitor body and thereafter a nickel layer is plated on top of the silver layer and then the nickel is coated with a solder such as tin or tin/lead which is either applied by plating or dipping. In addition to the precious metal cost savings realized by this method, nickel barrier terminations also offer excellent solderability and leach resistance.

A nickel barrier layer becomes nearly essential for surface mounting technology (SMT) as a result of the more vigorous soldering which takes place during direct surface mounting of the capacitor chip to the circuit board. As a result of the trend toward SMT, the use of nickel-platable silver end terminations is growing much faster than other types of terminating materials.

Conventional terminating compositions generally comprise a thick film paste containing a metal such as silver or silver/palladium which rely on glass frit to bond to the ceramic capacitor body. The use of the glass frit in certain cases leads to compatibility problems with the ceramic body and may even weaken the capacitor body itself. Also, thick film materials are very rheology sensitive and must be customized to each user's applications to avoid cosmetic problems with the final fired chip. Yield during assembly in surface mount is historically related to cosmetic appearance of the termination. In addition, capacitor chips terminated with conventional end termination compositions must be tumbled to remove sharp corners which would otherwise result in thin or bare spots on the termination.

SUMMARY OF THE INVENTION

The present invention is directed to a capacitor end termination composition and a method of terminating capacitors employing the novel composition.

The composition generally comprises a metallo organic silver resinate, at least one metallo organic base metal resinate, at least one metallo organic film forming resinate and a gel medium and solvent. For the sake of simplicity, "resinate" will be used hereinafter to mean metallo organic resinates. Resinates according to the present invention are compounds comprising a central metal ion linked to ligands, such as organic and inorganic molecules through a hetero atom bridge.

As defined herein, the base metal resinates act primarily as adhesion promoters. The film forming resinates are those resinates which promote the formation of a film on the surface on which the composition is applied.

The silver resinate based composition of the present invention is capable of providing extremely thin, smooth layers of metallization without the use of glass frit. Since the resinate based composition of the present invention is a pseudo-plastic conformal coating, it coats evenly at the corners, thereby eliminating the need for tumbling, and is not subject to the rheology/cosmetic problems of thick film pastes. Because of its capability of providing extremely thin smooth layers, less silver metal is required. This makes the use of this composition more economical than silver based thick film pastes which require relatively thick layers and therefore more silver. In fact, a given amount of the composition of this invention covers more than twice the surface area as compared with the prior art thick film pastes. Moreover, the composition of the present invention is compatible with virtually all types of capacitor ceramics and can be fired at lower temperatures than many of the thick film pastes.

According to the method of the present invention, the silver resinate based composition is applied to the ends of capacitor chips by a suitable method, preferably dipping. After it is dried and fired, a leach resistant layer such as a layer of nickel is applied. Then, a solder layer is applied such as a tin/lead solder.

The composition exhibits excellent platability and solderability with good adhesion and stability. The terminated capacitors coated with the composition of the present invention exhibit good electrical properties including capacitance and dissipation factor.

DESCRIPTION OF THE DRAWINGS

The Figure shows a cross-sectional view of a capacitor chip of this invention.

DESCRIPTION OF THE PREFERRED EMBODIMENT

According to the present invention, the capacitor end termination composition comprises a silver resinate, at least one base metal resinate, at least one rhodium resinate and a gel medium and solvent. While any suitable silver resinate may be employed, a combination of silver neodecanoate and silver naphtanate is presently preferred. The silver resinate is generally present in an amount of about 3 to 40% and more preferably in an amount of about 10 to 25%. The percentages given herein and those given hereinafter unless otherwise noted refer to the percent of metal present in the composition.

Suitable base metal resinates for use in the composition of the present invention include bismuth resinate, vanadium resinate, chromium resinate, tin resinate, silicon resinate, lead resinate, titanium resinate, boron resinate, tungsten resinate, copper resinate, zirconium resinate, aluminum resinate, cadmium resinate, neopium resinate and antimony resinate.

Illustrative of such base metal resinates are lead 2-ethylhexoate, ethylhexylborate, Al(butoxide)3, Cu(neodecanoate)2, silicon benzoyl/2-ethylhexoate, tetrabutyltitanate, titanium neopentenoate, maganese, zinc, chromium, bismuth and silicon 2-ethylhexoates, vanadium naphathonate, titanium isopropylate, tungsten cyclonol, boron-2-ethylhexanoyl, chromium isopropylate, lead-2-ethylhexoate, tin dibutylneodecanoate, neobiumbutylate, silicon benzylate and chromium methylsulfide.

It is presently preferred to employ a combination of base metal resinates including bismuth, silicon, aluminum, chromium, lead and tin resinates. The presently preferred resinates are bismuth-2-ethylhexoate, silicon benzoyl/2-ethylhexoate, Al(butoxide)3, chromium methylsulfide, lead 2-ethylhexoate, and tin dibutylneodecanoate.

The base metal resinates are generally present in an amount of about 0.3 to 3.0% and more preferably in an amount of about 0.5 to 2.0%. In the case of the preferred composition, the bismuth resinate is present in an amount of about 0.13 to 0.8%, the silicon resinate is present in an amount of about 0.07 to 0.14%, the aluminum resinate is present in an amount of about 0.22 to 0.77%, the chromium resinate is present in an amount of about 0.02 to 0.07%, the tin resinate is present in an amount of about 0.02 to 0.08% and the lead resinate is present in an amount of about 0.02–0.09%.

The presently preferred film forming resinate is a rhodium resinate such as rhodium-2-ethylhexoate. The film forming resinate is present in an amount of about 0.01 to about 1% and more preferably in an amount of about 0.01 to about 0.25%.

The medium which forms the remainder of the composition is composed of a gel medium and solvent. While any suitable gel medium and solvent may be employed it is presently preferred to employ a gel medium comprising a urea formaldehyde resin, p-toluenesulfonic acid dissolved in butynol, oil of amyris, terpineol and asphalt gilsonite resin. Suitable solvents include terpineol/dibutylphthalate, aromatic hydrocarbon fractions and dibuytlamine.

The medium including the gel medium and the solvent is present in an amount of about 10 to 50% and more preferably in an amount of about 20 to about 30%. The ratio of the gel medium to the solvent is generally about 1 to 2, but more preferably about 1 to 1.5.

The composition is prepared by mixing all of the ingredients together to form a paste which is preferably done by milling the mixture on a three roll mill.

As best shown in the Fig., the silver based resinate composition is applied to a ceramic body 10 at its ends to form layer 12 which connects electrodes 14. While any suitable method may be employed, it is presently preferred to apply the composition by dipping the ends of the capacitor chips into the composition. This can be done by either hand dipping or mechanical dipping using, for example, a Palomar machine, manufactured by Palomar Corporation. After the chips are dipped, they are dried and fired. The rheology of the composition should be adjusted so that no sagging will occur during drying or firing. This is accomplished by adjusting the amount of gel medium and solvent. Preferably, the chips are dried in an oven at about 125° C. for 25 to 30 minutes and fired in a BTU belt furnace at temperatures ranging of from about 600° C. to 850° C. burning away substantially all of the organic components of the composition. The thickness of layer 12 is of from about $0.2\mu$ to $5\mu$, and more preferably about $0.5\mu$ to $1\mu$.

Then, leach resistant boundary layers 16 are applied. It is presently preferred to employ nickel which may be applied by either electroplating or electroless plating. It is presently preferred to plate the nickel employing a nickel sulfamate bath at a current density of about 5 ASF. The plating time may range from about 30 to 50 minutes. Layer 16 generally has a thickness of from about $1\mu$ to $4\mu$.

Next, a solder layer 18 may be applied. Any suitable solder may be employed. It is, however, presently preferred to use a tin/lead solder preferably in a ratio of 60 parts tin to 40 parts lead. The tin/lead solder is applied by dipping the chip already coated with a layer of the composition of the present invention and a leach resistant layer into a tin/lead bath at a temperature of about 235° C. for about 5 seconds. Layer 18 generally has a thickness of from about $1\mu$ to $4\mu$. Alternatively, tin or tin/lead solder may be applied by electroplating.

The result is a terminated capacitor 20 ready for installation into a circuit. If other than surface mounting is desired, leads may be soldered to the ends of the capacitor.

The following Examples will further illustrate the present invention:

EXAMPLE 1

The following materials were mixed together: 40 g silver neodecanoate powder (38%), 0.4 g rhodium-2-ethylhexoate (15.0%), 8 g of a resinate flux system. The resinate flux system was prepared by mixing together 10 g of bismuth-2-ethylhexoate (25.12%), 15 g silicon benzoyl/2-ethylhexoate (9.35%), 28.8 g Al(butoxide)3 (2.65%), 7 g chromium methylsulfide (9.6%), 25 g tin dibutylneodecanoate (3.1%), 3 g lead-2-ethylhexoate (27.85%) and 21 g of a medium composed of terpineol and asphalt gilsonite resin which is a natural asphalt manufactured by Ziegler Corporation. The remaining part of the composition was composed of 20 g of a gel medium comprising 25% urea formaldehyde resin, 2% p-toluenesulfonic acid dissolved in butynol, 10% oil of amyris and 63% of a mixture of terpineol and asphalt gilsonite resin in a 50/50 ratio. Also added were 6 g of a 50/50 mixture of terpineol and dibutylphthalate, 12 g of silver naphtanate (30%) and 4 g of dibutylamine. (The percentages in parenthesis after the resinates represent the percent of metal in the resinate.) All of the materials were mixed together and prepared into a paste on a three-roll mill.

EXAMPLE 2

The following materials were mixed together: 28 g of silver neodecanoate powder (38%), 0.4 g of rhodium-2-ethylhexoate (15%), 8 g of the resinate flux system described in Example 1, 20 g of the gel medium described in Example 1, 8 g of 50/50 mixture of terpineol and dibutylphthalate, 8 g of dibutylamine, 4 g of camphor, 12 g of terpineol and 10 g of silver naphtanate (30%). The materials were all mixed together then formed into a paste on a three-roll mill.

EXAMPLE 3

The following materials were mixed together: 26 g of silver neodecanoate solution (25%), 0.4 g of rhodium-2-ethylhexoate (15%), 8 g of the resinate flux system described in Example 1, 28 g of the gel medium described in Example 1, 12 g of terpineol, 8 g of a 50/50 mixture of terpineol and dibutylphthalate, 4 g of tricresol-phosphate and 12 g of silver naphtanate (30%). The materials were mixed and processed into a paste on a three-roll mill.

EXAMPLE 4

The following materials were mixed together: 108 g of silver neodecanoate solution (25%), 0.15 g of rhodium-2-ethylhexoate (15%), 10 g of the resinate flux system described in Example 1, 7 g of dipentene, 1.8 g of Bentone ® 38 which is manufactured by NL Industries, Inc., 0.6 g of butoxyne, a wax, 2.0 g of dibutylamine and 7 g of a solvent. The solvent was prepared by mixing together 20 g of asphalt gilsonite resin and 80 g of dipentene. This resulted in 136.25 g of a mixture which was then reduced to 80 g by heating it on a steam bath. Thereafter, 3 g of silver naphtanate (30%), 6 g of aromatic hydrocarbon HA40 manufactured by Union Chemical Co., 10 g of the gel medium described in Example 1 and 1 g of Cab-0-sil, a fumed silica manufactured by Cabot. The resulting mixture was processed on a three-roll mill into a paste.

EXAMPLE 5

The following materials were mixed together: 9.25 g of silver neodecanoate powder (38%), 23.15 g of silver neodecanoate solution (25%), 9.25 g silver naphtanate (30%), 0.46 g rhodium-2-ethylhexoate (15%), 11.57 g of the resinate flux system described in Example 1, 23.15 g of the gel medium described in Example 1, 13.89 g of a 50/50 mixture of terpineol and dibutylphthalate, 4.63 g of dibutylamine in 4.63 g of Aromatic Hydrocarbon 150 manufactured by Exxon Corporation. The materials were mixed together and formed into a paste by means of processing on a three-roll mill.

EXAMPLE 6

A capacitor chip was terminated with the end termination composition of Example 1. A capacitor chip was hand dipped in the composition of Example 1, dried in an oven at 125° C. for 25 to 30 minutes and fired in a BTU belt furnace at temperatures ranging from 600° C. to 850° C. Then, the chips were barrel plated in a nickel sulfamate bath at a current density of 5 ASF. The plating time was approximately 40 to 45 minutes. Thereafter, the chips were solder coated by dipping in a 60/40 Sn/Pb bath at 235° C. for 5 seconds.

The solder leaching was tested by subjecting the capacitor chip to ten 5 second dips at 260° C. After dipping, the chips were cleaned and visually examined. No leaching was observed after the 50 second dip.

One of the more important parameters is the adhesion of the termination composition to the ceramic body. To measure the adhesion, a nail head was soldered to each end of the chip so that the length of the lead is parallel to the length of the chip (the two leads must also be in the same axis), then the leads were pulled in opposite directions until the termination came off. An average pull strength of 11.3 pounds was measured using a pull tester. The nail heads used were 50 mil in diameter. Generally, a pull strength of about 4 to 18 lbs is acceptable.

Electrical measurements were also taken. Capacitance and dissipation factor were measured for the capacitor chips before and after plating with nickel to determine whether or not the plating solution had affected the performance of the chips. As a control, a conventional silver paste containing silver metal and glass frit was used as a control. All of the capacitor chips were prepared by the method described in Example 6, expect different capacitor chips were used, the principal difference being the composition of electrodes (Ag/Pd and Pd). The results for the composition of the present invention are shown in Table 1 and those for the control are shown in Table 2.

TABLE 1

| | Capacitance | | Dissipation Factor (DF) | |
|---|---|---|---|---|
| | Case A* | Case B* | Case A* | Case B* |
| Chip 1 (Ag/Pd) | 123.45 | 123.37 | 0.0149 | 0.0150 |
| Chip 2 (Ag/Pd) | 103.10 | 103.00 | 0.022 | 0.0213 |
| Chip 3 (Pd) | — | — | — | — |
| Chip 4 (Pd) | 825.98 | 834.55 | 0.00048 | 0.000385 |

*Case A is before plating and Case B is after plating.

TABLE 2

| | Capacitance | | Dissipation Factor (DF) | |
|---|---|---|---|---|
| | Case A* | Case B* | Case A* | Case B* |
| Chip 1 (Ag/Pd) | 122.66 | 122.77 | 0.0148 | 0.0143 |
| Chip 2 (Ag/Pd) | 104.44 | 102.55 | 0.0223 | 0.0233 |
| Chip 3 (Pd) | 863.3 | | 0.0003 | |

*Case A is before plating and Case B is after plating.

As can be seen from Tables 1 and 2, the capacitance and dissipation factor did not change and are comparable to that of the control chips for chips 1, 2 and 4. However, the values measured for chip 3 were widely scattered and anomalously low. No values were recorded for these chips. Visual observation showed that the silver from the termination had diffused into the palladium electrode of chip 3 leaving no metal film on the ceramic surface to connect the capacitors electrodes. This resulted because chip 3 was a chip with pure palladium electrodes unlike chips 1 and 2 which contained silver/palladium electrodes. While some diffusion also occurs with the thick film termination (control), the ink is sufficiently thick so that the terminations are still intact after firing. In order to remedy this problem, the chips were fired at 600° C. It was found that at 600° C. the diffusion is low enough so that capacitance and dissipation factor of the chip could be measured. These results are shown in Table 1 for chip 4.

The viscosity of the ink of Example 1 was monitored for one month and no change was observed indicating good stability.

What is claimed is:

1. A capacitor end termination composition comprising at least one silver resinate in an amount of about 3 to 40%, at least one based metal resinate in an amount of about 0.3 to 3.0%, a film forming resinate in an amount of about 0.01 to 1%, a gel medium and a solvent in an amount of about 10 to 50%, the percentages being weight percent based on the amount of metal in the composition.

2. The composition of claim 1, wherein the silver resinate is a mixture of silver neodecanoate and silver naphtanate.

3. A capacitor end termination composition comprising a silver resinate in an amount of about 3 to about 40%, a bismuth resinate in an amount of about 0.13 to 0.8%, a silicon resinate in an amount of about 0.07 to 0.14%, an aluminum resinate in an amount of about 0.22 to 0.77%, a chromium resinate in an amount of about 0.02 to 0.07% a tin resinate in an amount of about 0.02 to about 0.08%, a lead resinate in an amount of about 0.02 to 0.09%, and a gel medium and a solvent in an amount of about 10 to 50%, the percentages being weight percent based on the amount of metal in the composition.

4. The composition of claim 3, wherein the silver resinate is silver neodecanoate.

5. The composition of claim 4, wherein the aluminum metal resinate is Al(butoxide)$_3$, the bismuth resinate is bismuth-2-ethylhexoate, and the silicon resinate is siliconbenzoyl/2-ethylhexoate, the chromium resinate is chromium methylsulfide, the tin resinate is tin dibutylneodecanoate, the lead resinate is lead-2-ethylhexoate and the film forming resinate is rhodium-2-ethylhexoate.

6. A capacitor comprising a ceramic body containing electrodes embedded therein, said electrodes protruding from the ends of the ceramic body, a terminating layer connecting the electrodes at each of the ends of the ceramic body whereat the electrodes protrude, said terminating layer comprising grit-free silver and being of a thickness of not more than 5μ, and a leach boundary layer on each of the terminating layers.

7. The capacitor according to claim 6, wherein the capacitor further comprises a solder layer deposited on each of the leach resistant boundary layers.

8. A capacitor according to claim 7, wherein the solder layer comprises tin/lead.

9. The capacitor according to claim 6, wherein the leach resistant boundary layer is substantially nickel.

10. The capacitor according to claim 6, wherein the silver based termination layer is produced by dipping the capacitor in a silver resinate based composition.

11. A method of making a ceramic capacitor comprising selectively depositing on a ceramic body containing electrodes a composition containing a silver resinate, at least one beam metal resinate, at least one film forming resinate and a gel medium and solvent; drying the resulting product; heating the dry product; depositing a layer of nickel over each of the terminating layers.

12. The method according to claim 11, wherein the silver resinate is a mixture of silver neodecanoate and silver naphtanate.

* * * * *